United States Patent
Frey

(10) Patent No.: US 7,763,854 B2
(45) Date of Patent: Jul. 27, 2010

(54) HIGH TIME-RESOLUTION ULTRASENSITIVE OPTICAL DETECTOR, USING GRATING COUPLING

(75) Inventor: Laurent Frey, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 482 days.

(21) Appl. No.: 11/861,876

(22) Filed: Sep. 26, 2007

(65) Prior Publication Data
US 2009/0020701 A1    Jan. 22, 2009

(30) Foreign Application Priority Data
Oct. 5, 2006 (FR) .................................. 06 54109

(51) Int. Cl.
*H01L 39/00* (2006.01)
(52) U.S. Cl. ............ 250/336.2; 250/338.1; 250/370.01; 385/37; 385/14; 385/129
(58) Field of Classification Search ............ 250/336.2, 250/338.1, 370.01; 385/14, 37, 129
See application file for complete search history.

(56) References Cited

U.S. PATENT DOCUMENTS

| | | | | |
|---|---|---|---|---|
| 5,532,485 | A * | 7/1996 | Bluzer et al. ............. | 250/336.2 |
| 5,619,369 | A * | 4/1997 | Yamamoto et al. ......... | 359/332 |
| 5,907,427 | A * | 5/1999 | Scalora et al. ............. | 359/248 |
| 5,925,878 | A * | 7/1999 | Challener ................ | 250/225 |
| 6,812,464 | B1 | 11/2004 | Sobolewski et al. | |
| 6,816,648 | B2 * | 11/2004 | Goldstein .................. | 385/37 |
| 6,998,613 | B2 * | 2/2006 | Syllaios et al. ......... | 250/339.02 |
| 7,327,454 | B2 * | 2/2008 | Cunningham et al. ...... | 356/326 |
| 7,575,939 | B2 * | 8/2009 | Cunningham et al. ...... | 436/524 |
| 2007/0013679 | A1 * | 1/2007 | Gruhlke ................... | 345/175 |

FOREIGN PATENT DOCUMENTS

FR    2 812 455    2/2002

OTHER PUBLICATIONS

U.S. Appl. No. 11/915,946, filed Nov. 29, 2007, Frey et al.
J-C Villégier, et al. "Fabrication of High-Speed Single Photo detectors in NbN for Quantum Information Processing", Journal of Physics: Conference Series vol. 43, XP-002432437, 2006, pp. 1373-1376.
I. Milostnaya, et al. "Superconducting single-photon detectors deigned for operation at 1.55-µm telecommunication wavelength" Journal of Physics: Conference Series, vol. 43, , XP-002432438, 2006, pp. 1334-1337.

(Continued)

*Primary Examiner*—David P Porta
*Assistant Examiner*—Djura Malevic
(74) *Attorney, Agent, or Firm*—Oblon, Spivak, McClelland, Maier & Neustadt, L.L.P.

(57) ABSTRACT

This detector is intended to detect at least one photon and comprises a dielectric substrate (30), of index $n_O$; a detecting element (32) forming a serpentine, placed on the substrate and generating a signal using the energy of the photon(s); a dielectric grating, formed of lines of index $n_H$, alternating with lines of index $n_B$, avec $n_H > n_O$ and $n_H > n_B$, the grating being placed above the detecting element, the set grating-element presenting a resonant absorption in a given incidence and for a given polarisation; and a superstratum (40) having a refractive index $n_i$, this superstratum being placed above the one-dimensional dielectric grating, $n_H$ being furthermore greater than $n_i$.

14 Claims, 5 Drawing Sheets

OTHER PUBLICATIONS

David L. Brundrett, et al. "Effects of modulation strength in guided-mode resonant subwavelength gratings at normal incidence" Optical Society of America, vol. 17, Jul. 2000, pp. 1221-1230.

G.N. Gol'Tsman, et al. "Fabrication of Nanostructured Superconducting Single-Phonton Detectors" IEEE Transactions on Applied Superconductivity, vol. 13, No. 2, Jun. 2003, pp. 192-195.

Deborah Jackson, et al. "High bandwidth, Improved Quantum Efficiency Detector Development for Multi-GHz Class QKD Throughput" NASA, 7 Pages.

Andrew J. Kerman, et al. "Kinetic-inductance-limited reset time of superconducting Nanowire Photon counters" American Institute of Physics, Applied Physics Letters 88, 111116, Pub. Mar. 16, 2006, pp. 1-3.

A. Korneev, et al. "Quantum Efficiency and Noise Equivalent Power of Nanostructured, NbN, Single-Photon Detectors in the Wavelength Range From Visible to Infrared", IEEE Transactions on Applied Superconductivity, vol. 15, No. 2, Jun. 2005, pp. 571-574.

P. LeCoupanec, et al. "An ultra-low dark-count and jitter, superconducting, single-photon detector for emission timing analysis of integrated circuits" Pergamon, Microelectronics Reliability 43 (2003) pp. 1621-1626.

M. Neviere, et al. "Systematic Study of Resonances of Holographic Thin Film Couplers" Optics Communications, vol. 9, No. 1, Sep. 1973, pp. 48-53.

R. Romestain, et al. "Fabrication of superconducting niobium nitride hot electron bolometer for single-photon counting" New journal of Physics 6 (2004), pp. 1-15.

David Rosenblatt, et al. "Resonant Grating Waveguide Structures" IFEE Journal of Quantum Electronics, vol. 33, No. 11, Nov. 1997, pp. 2038-2059.

Kristine M. Rosfjord, et al. "Nanowire Single-photon detector with an integrated optical cavity and anti-reflection coating" Optics Express, vol. 14, No. 2, Jan. 23, 2006, pp. 527-534.

J. C. Villegier et al., "Fabrication of analog-to-digital modulators and high-speed single photon detectors in NbN for Quantum information processing" CryoPhysics Laboratory, CEA-Grenoble, pp. 1-49.

P. Vincent, et al. "Corrugated Dielectric Waveguides: A Numerical Study of the Second-Order Stop Bands" Applied Physics 20, 1979, pp. 345-351.

Joel K. W. Yang, et al. "Fabrication Development for Nanowire GHz-Counting-Rate single-Photon Detectors" IEEE Transactions on Applied Superconductivity, vol. 15, No. 2, Jun. 2005, pp. 626-630.

Feng Yang "Photo-détecteurs supraconducteurs pour l'information quantique photonique" Rapport De Stage D'option Scientifique, Ecole Polytechnique Promotion X2001, 1 front page and pp. 1-2, 20-29, 38.

U.S. Appl. No. 11/911,667, filed Oct. 16, 2007, Frey et al.

* cited by examiner

HIGH TIME-RESOLUTION ULTRASENSITIVE OPTICAL DETECTOR, USING GRATING COUPLING

TECHNICAL FIELD

This invention relates to a high time-resolution ultrasensitive optical detector, and in particular a superconducting single photon detector, more simply referred to as SSPD.

The detector object of the invention uses a grating coupling and is able to operate at normal incidence.

The invention is especially used to detect and locate the operating faults of a semiconductor integrated circuit, by detecting the emission of specific photons by defective transistors.

It also applies to receiving and routing circuits for very high speed telecommunications, especially those that are intended for telecommunications satellites, because of the very low thermal dissipation of the detector object of the invention.

The invention further applies to the coding and detecting of the quantum code key in a cryptographic system.

It also applies to the fabrication of matrices of detectors for very highly sensitive imaging, as well as to single photon or correlated photon tomography.

PRIOR ART

Emerging techniques, such as quantum cryptography and calculation, testing for defective integrated circuits in microelectronics, photonic detection medical imagery, detecting biological objects or the detection of very weak signals for telecommunications or astronomy, require radiation detectors, especially in the visible region or the near-infrared region, that are very fast, that have very low jitter, that make very little noise and that are extremely sensitive: they must be able to detect very weak flows, or even a single photon.

On this subject, reference shall be made to document [Romestain 04] which, as the other documents mentioned further on, is mentioned at the end of this disclosure.

SSPDs potentially have all of the above-mentioned qualities and are good candidates to replace current avalanche photodiodes and photomultiplier tubes, whose performance is limited, especially in the infrared region.

SSPDs exist in the form of STJ, i.e. superconducting tunnel junctions, and in the form of bolometers, among which there are bolometers called HEBs, i.e. hot electron bolometers, which are the fastest.

HEBs use ultra-thin superconducting films, whose thickness is equal to less than 10 nm, in order to obtain very short characteristic times, of about 10 ps (see [FR 2 812 455]). For these films, the preferred material is niobium nitride (NbN) in cubic B1 phase.

In these HEBS, the NbN film is epitaxied on a substrate which is typically made of sapphire and whose orientation is 1T02 (plane R); and after structuration, this film forms meanders whose width is about 100 nm, the film thus having the form of a serpentine in the active portion of the detector (see [Villégier 04]).

FIG. 1A is a schematic cross-section view of such a detector. In this figure, the NbN film and the substrate have references 2 and 4 respectively. FIG. 1B is a schematic top view of the detector.

A light beam I arrives on the latter, at normal incidence, and is coupled to it by the intermediary of an optical fibre (not shown). References R and T correspond to the reflected and transmitted light beams respectively. Projection of the incident beam I on the detector is shown by a dotted line in FIG. 1B where it bears reference 1.

The fabrication, operation and characterisation of these SSPD detectors are described for example in [Goltsman 03]. Detection efficiency, or conversion efficiency of a photon into an electric signal, is a key parameter that must be optimised and which would be 100% for an ideal detector.

It depends on the fill factor (overlap rate of the incident beam and of the active zone of the detector), on the optical absorption in the NbN layer and on the capacity of the hot spot, which is formed subsequent to the absorption of the photon, of creating a transitory resistive barrier across the entire width of the superconducting track. Detection efficiency is distinguished from quantum efficiency which is defined for an overlap rate of 100%.

The serpentine structure was imagined in order to increase the fill factor compared to a simple straight track of NbN, deposited onto a sapphire substrate and illuminated at normal incidence. In the latest realisations (see [Yang 05]), the fill factor reaches 75%.

Optical absorption by NbN is about 30% for a thickness of 4 nm, at a wavelength of 1.55 μm. The only way to increase this would be to increase the thickness of the NbN layer, but the relationship between the hot spot section and the section of the superconducting track would decrease, since the width of this track is limited to about 50 nm, and this would result in a drop in overall efficiency.

Detection efficiency therefore cannot exceed, in theory, 20 to 25% at 1.55 μm (for a fill factor of 75%) with this architecture which is mainly limited by the very low thickness of the NbN layer illuminated at normal incidence.

It would probably be difficult to considerably increase detection efficiency without changing the design of the optical coupling. Detectors carried out with a fill factor of 50% moreover present efficiencies from 5 to 10% at 1.55 μm (see [Korneev 05]).

Several solutions have been proposed to increase the coupling of the light in the absorbent region of the detector.

For example, it has been proposed to use a mirror and an antireflection coating. Light that has traversed the NbN without having been absorbed is then reflected back to the NbN by a concave mirror (see [FR 2 812 455]) or by a flat mirror (see [Le Coupanec 03] and [Rosfjord 06]). An antireflection layer, which is deposited on the rear face of the substrate if the incidence is done from the rear, makes it possible moreover to reduce reflection losses of the incident wave. Detection efficiency reaches values of the order of 50%.

It has also been proposed to use a coupling by waveguide (see [Jackson 03]). According to this approach, which is schematically shown in FIG. 2, light 6 coming from a singlemode optical fibre 8 is focused following a line by a diffractive optical element 10 and injected by the latter in a silicon planar multimode waveguide 12 which is formed on a silica substrate 14. Note that this waveguide is singlemode vertically but multimode laterally.

An NbN serpentine 16 is deposited on top of this silicon guide. The ends of this serpentine are respectively equipped with contact pads 18 and 20. Serpentine 16 absorbs the evanescent wave which is associated with the guided mode.

A photon, that is to be detected, is likely to be absorbed by a branch of meanders formed by the serpentine, at each passage of the evanescent wave. Absorption of the light energy by the NbN can, in principle, approach 100% if there are enough meanders. But, in fact, detection efficiency is limited by the great length of NbN.

In addition, the feasibility of monocrystalline NbN growth on the silicon has not yet been clearly demonstrated: the epitaxial growth of NbN on Si requires delicate surface treatments of the silicon as well as an examination of the deposit of interface layers by epitaxy.

Reference can also be made to document [Wang 04]. In the latter, absorption of an NbN layer is studied, placed in a stack of planar layers, wherein a guided wave propagates.

An example of such a structure is schematically shown in FIG. 3A where substrate 22 is shown covered with a layer of sapphire 24, serving as a waveguide, and a layer of NbN 26 that covers this layer 24. In an alternative, which is schematically shown in FIG. 3B, the NbN layer is comprised between the substrate and the layer of sapphire.

If the waveguide is such a layer of sapphire of appropriate thickness, the length of NbN required to absorb the light is typically of a few dozen micrometers (with calculations performed in one dimension, for planar guides).

However, neither the structuration of the waveguide and of the NbN in the plane of the layers, nor the practical carrying out of the detector are considered in this document [Wang 04]: no technological solution including the choice of materials, a method of fabrication and the methods for injecting the light in the considered is provided.

DISCLOSURE OF THE INVENTION

This invention aims at solving the problem in the designing of a high time-resolution ultrasensitive optical detector, especially of a detector of the SSPD type, this detector presenting a detection efficiency that is clearly superior to those which are obtained in prior art, this detector being able to operate at normal incidence and furthermore able to be carried out using existing technological means.

Operating at normal incidence makes it possible to consider simple positioning and reduced-space system in a cryostat, and the possibility of extending the coupling principle to a matrix of detectors used for example in imaging.

Precisely, this invention relates to an optical detector, intended to detect at least one photon, this detector comprising:

- a dielectric substrate, having a refractive index $n_O$, and
- a detecting element forming a serpentine, the detecting element being placed on the dielectric substrate and designed to generate an electric signal using the energy of the photon(s) received, this optical detector being characterised in that it further comprises

- a one-dimensional dielectric grating, including parallel lines, namely first lines that are made of a first dielectric material having a refractive index $n_H$, and second lines that alternate with the first lines and that are made of a dielectric medium having a refractive index $n_B$, the one-dimensional dielectric grating being placed above the detecting element, the set constituted by the one-dimensional dielectric grating and the detecting element presenting a resonant absorption of the photon(s), at a given incidence and for a given polarisation of the photon(s), $n_H$ being greater than $n_O$ and $n_B$, and
- a superstratum having a refractive index $n_i$, this superstratum being placed above the one-dimensional dielectric grating, $n_H$ furthermore being greater than $n_i$.

The structure of the optical detector, object of the invention, makes it possible to improve detection efficiency substantially using the one-dimensional dielectric grating located above the detecting element forming a serpentine.

Note that the detector, object of the invention, must be able to operate with a very weak flow of photons. The probability of a photon being absorbed is assumed to be proportional to the local intensity of the field that would exist with a large and continuous flow of photons (same cartographies).

Preferably, the given incidence is a normal incidence.

The superstratum can be a gas, for example air, a liquid, a solid or even a vacuum (in which case $n_i$ is equal to 1).

According to a preferred embodiment of the invention, pitch $\Lambda$ of the one-dimensional dielectric grating is less than $\lambda_O/n_O$, where $\lambda_O$ represents the wavelength in vacuum of the photon(s), and the pair $(w_r/\Lambda, d)$ is selected to lead to a resonant absorption, where $w_r$ represents the width of the first lines of the one-dimensional dielectric grating and d represents the thickness of this one-dimensional dielectric grating, and $\Lambda$ is furthermore less than $\lambda_O/n_i$.

The difference $n_H - n_B$ is preferably greater than 1.

According to a preferred embodiment of the optical detector object of the invention, the detecting element is made of a superconducting material.

This superconducting material can be a phase of superconducting nitride. This phase can be niobium nitride.

According to a particular embodiment of the invention, the serpentine includes parallel lines, connected to each other, and each line of the serpentine is positioned facing one of the lines of the one-dimensional dielectric grating.

According to a particular embodiment of the optical detector object of the invention, the serpentine includes parallel lines, connected to each other, and each line of the serpentine is positioned facing one of the first lines of the one-dimensional dielectric grating.

According to a first particular embodiment of the invention, the serpentine includes parallel lines, connected to each other, and the lines of the serpentine and the first lines of the one-dimensional dielectric grating have the same width and form periodic units having the same period.

According to a second particular embodiment of the invention, the first lines of the one-dimensional dielectric grating have different widths $w_{rL}$ and $w_{rS}$ and the first lines whose width equals $w_{rL}$ alternate with those whose width equals $w_{rS}$.

The second lines of the one-dimensional dielectric grating can also have different widths.

According to a particular embodiment of the invention, the optical detector further comprises an intermediary layer that is made from a dielectric material having a refractive index n greater than $n_B$ and which is placed between the detecting element and the one-dimensional dielectric grating.

This invention also relates to an optical detector, intended to detect photon(s), this optical detector including a polarisation splitter including an input port, intended to receive the photon(s), and two output ports which are respectively connected to two optical detectors in accordance with the invention.

This invention further relates to a matrix of optical detectors in accordance with the invention.

BRIEF DESCRIPTION OF THE DRAWINGS

This invention shall be better understood when reading the description of examples of embodiments provided hereinafter, purely for information and in no way limited, in reference to the annexed drawings in which.

DETAILED DISCLOSURE OF PARTICULAR EMBODIMENTS

Figure 4:
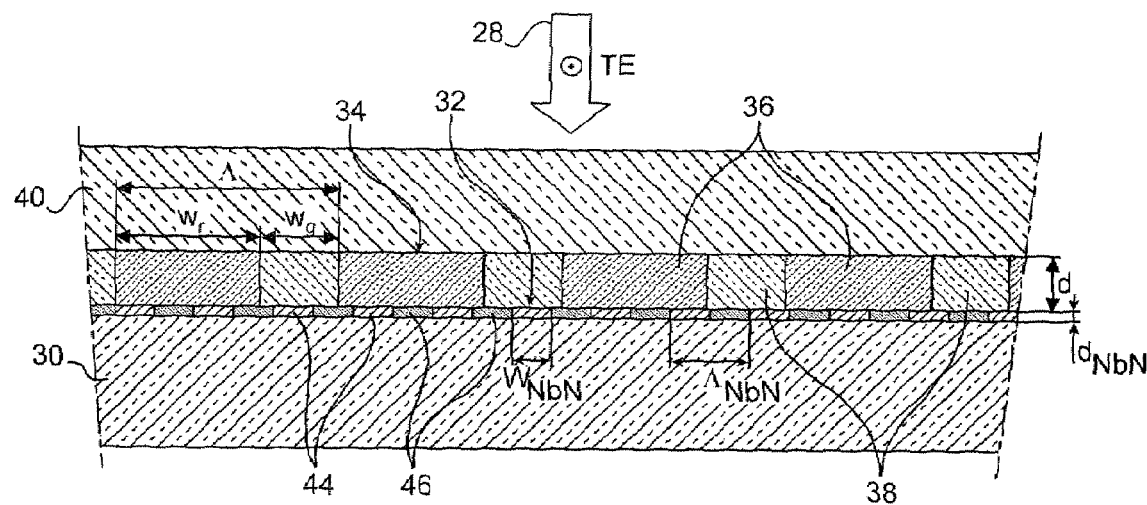
FIG. 4 is a schematic cross-section view of a first example of the detector object of the invention.

FIG. 4 is a schematic cross-section view of an example of the detector object of the invention. This detector is intended to detect an incident light 28, constituted of a single photon or of several photons.

The structure considered in FIG. 4 includes a dielectric substrate 30, whose refractive index is noted $n_O$, and an ultra-thin superconducting layer 32, for example of NbN, whose thickness is equal to a few nanometers, on dielectric substrate 30. The latter is appropriate for the deposit of layer 32.

This layer 32 is intended to generate an electric signal using the energy of the photon(s) received. It forms a serpentine and therefore meanders as in prior art.

Figure 1A:
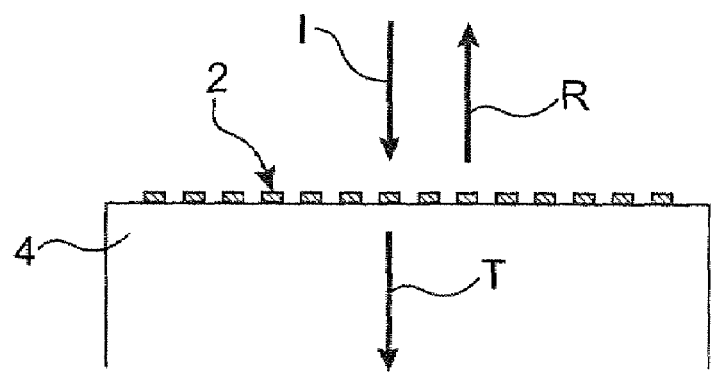
FIG. 1A is a schematic cross-section view of a known detector, of the SSPD type, and has already been described.
Figure 1B:
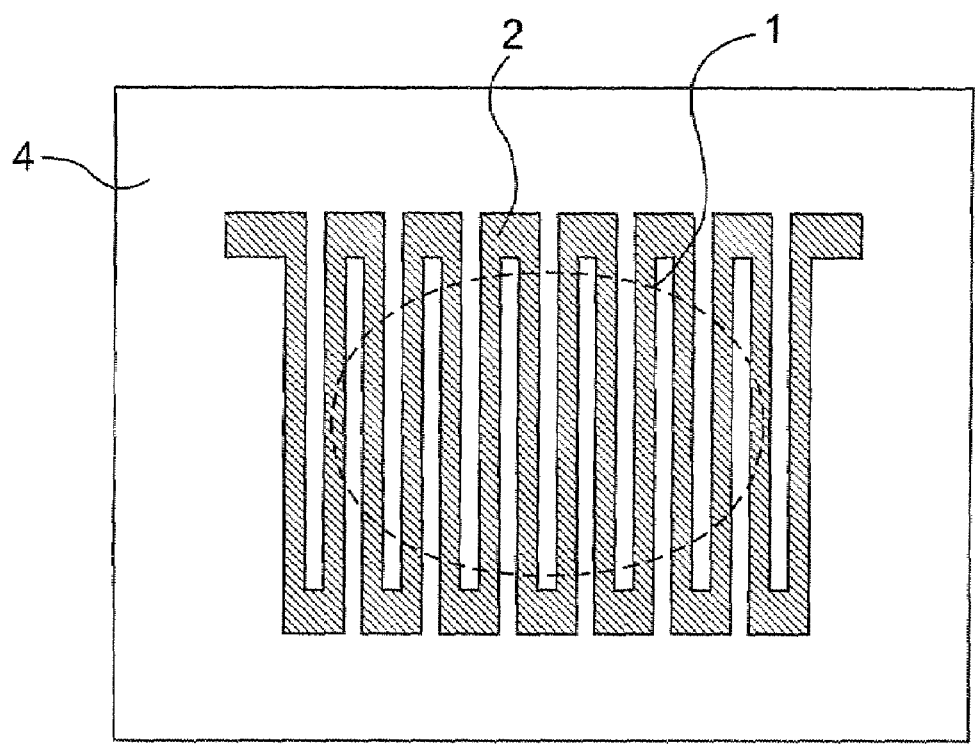
FIG. 1B is a schematic top view of the detector in FIG. 1A, and has already been described.
Figure 2:
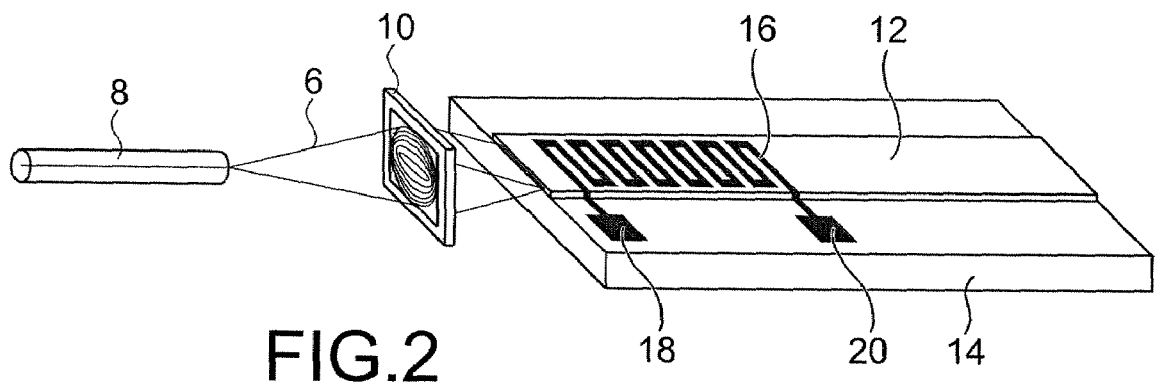
FIG. 2 is a schematic perspective view of another known detector, of the SSPD type, and has already been described.
Figure 3A:
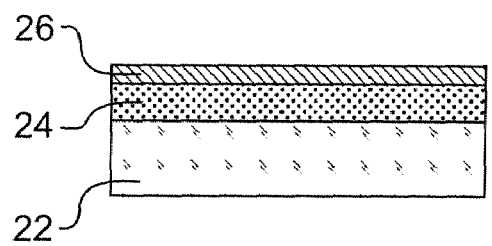
FIGS. 3A and 3B are schematic views of known planar multilayer structures, with guided waves, and have already been described.
Figure 3B:
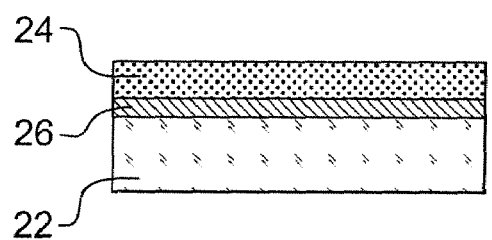

Reference will be made for example to FIG. 1B of the appended drawings where the layer includes parallel lines connected to one another by segments that are shorter than these lines and are perpendicular to the latter.

Other configurations can be considered for the serpentine, preferably configurations wherein the serpentine covers the greatest surface area possible in the zone illuminated by the incident light, in such a way that a maximum number of photons are absorbed by the superconductor of which the serpentine is made.

The detector in FIG. 4 also includes a one-dimensional dielectric grating 34, including parallel lines 36 that are formed on top of superconducting layer 32, in a dielectric material with a high $n_H$ index. These lines 36 alternate with other lines 38 that are made of a dielectric medium of low index $n_B$. As can be seen, lines 36 and 38 are parallel to the lines of layer 32.

Moreover, the detector includes a superstratum 40 whose refractive index is noted $n_i$. This superstratum is placed above the dielectric grating 34.

The period, or pitch, of the grating 34 is noted $\Lambda$, the width of lines of high index $w_r$, and the width of the lines of low index $w_g$.

It should be noted that, in the example in FIG. 4, all the lines 36 of grating 34 have the same width $w_r$ and the grating is therefore said to be symmetric.

In addition, the superconducting lines 44 of layer 32 are separated by intervals 46 which are made of a dielectric material whose refractive index is noted $n_F$.

The operating principle of the detector in FIG. 4 is based on the excitation of a resonant absorption of incident light 28 in the segmented guide constituted by grating 34 (see further on), for a given polarisation and wavelength, for example a TE polarisation, of incident light 28 (the direction of polarisation then being parallel to the lines of grating 34).

In the absence of superconducting layer 32, incident light 28 is partially reflected in superstratum 40, partially transmitted in substrate 30, and partially diffracted by the segmented guide that is constituted by grating 34. The guided light is then partially re-diffracted in superstratum 40 and in substrate 30.

Light directly transmitted in the substrate and the light that is coupled and then re-diffracted in this substrate interfere destructively: their phaseshift is equal to $\pi$ (see [Rosenblatt 97]).

For a certain wavelength in vacuum $\lambda_0$ of incident light 28 and a certain orientation of this incident light in relation to the direction of the lines of the grating, the two waves have the same amplitude and the destructive interferences are complete. Transmission is zero and all of the incident light is reflected. The structure described is therefore a resonating structure in reflection (see [Nevière 73]).

Figure 5:
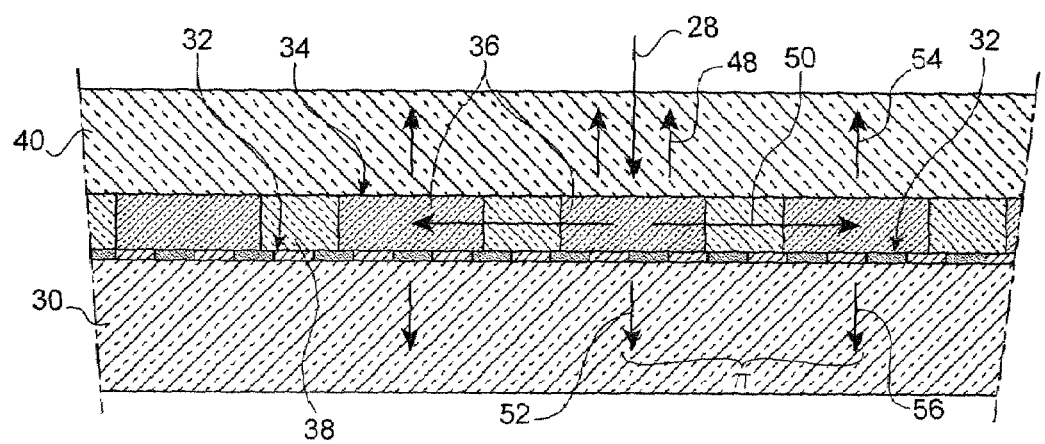
FIG. 5 shows schematically the waves that come into play in the grating that the detector includes in FIG. 4, FIGS. 6 to 8 are schematic cross-section views of other examples of detectors in accordance with the invention.

FIG. 5 shows schematically the waves that come into play in a grating 34 which has a resonance in reflection, as in the example that was described above.

In FIG. 5, the incident light can still be seen 28 (normal incidence in the example shown) and references 48, 50, 52, 54 and 56 represent respectively the light that is directly reflected, light guided by the segmented guide, light transmitted directly, light guided by the segmented guide and then radiated in the superstratum and light guided by the segmented guide and then radiated in the substrate.

The letter $\pi$ symbolises the fact that the light transmitted directly in the substrate and the light coupled then re-diffracted in the substrate interfere destructively.

The operating principle that has just been described applies to a normal incidence of light 28, this light 28 then falling perpendicularly to the surface of superstratum 40.

However, it can be applied to any incidence angle of this light, ranging from 0° to 90°.

Moreover, this principle applies in the case of FIG. 4 where the layer constituted of lines 36 and 38 have a double function of grating and of a guide. The guide is said to be segmented. But this principle can also apply in the case where this grating and the guide constitute two superimposed layers.

In literature, segmented guides have initially been examined with low index contrasts, as spectral filters of very narrow bandwidth (less than 1 nm).

It was then shown (see [Brundrett 00]) that with a high index contrast, and with a normal incidence, certain geometrical configurations of gratings provided access to much wider resonances in reflection from a wavelength standpoint (100 to 200 nm), which is favourable for detection applications as is the case for this invention.

Angular acceptance in the device is also much wider and allows a focused beam to be coupled. Finally, tolerance on grating thickness is substantially increased.

Note that the superstratum can be simply comprised of air ($n_i$ then being equal to 1) Likewise, lines 38 of grating 34 can be air.

In this invention, on utilise more preferably a high index contrast, which is typically such that the difference $n_H - n_B$ is greater than 1.

The structured and very thin superconducting layer (thickness of a few nanometers) comes to disturb the resonance by absorbing a portion of the light. Transmission is no longer rigorously zero at resonance but remains low, and the reflection can decrease substantially. Typically, 80% of the incident light can be absorbed.

Absorption can be optimised by slightly modifying the geometry of grating 34, pertaining to its fill factor and its thickness.

The conditions to satisfy in order to obtain a resonance in absorption are as follows:

guiding condition: $n_H > n_i$, $n_H > n_O$, $n_H > n_B$, preferably $n_H - n_B > 1$, no diffracted order other than specular order: $\Lambda < \lambda_0/n_O$ and $\Lambda < \lambda_0/n_O$ (grating 34 thus having a pitch lower than the wavelength in vacuum), choice of a pair (f,d) which gives a resonance, where f is the fill factor for the grating, such that $f = w_r/\Lambda$, and d is the thickness of grating 34.

Purely for information and in no way limited, the following values can be used for the example that has just been described in reference to FIG. 4:

$\lambda_0 = 1554$ nm;

$n_i = 1$ (constituting medium of the superstratum: air); $n_O = 1.746$ (constituting medium of the superstratum: sapphire); $n_B = 1$ (constituting medium of lines 38: air); $n_H = 3.48$ (constituting material of lines 36: silicon); $\Lambda = 800$ nm;

$\Lambda_{NbN} = 400$ nm; $f_{NbN} = 0.5$; $d_{NbN} = 4$ nm; $n_F = 1.45$ ($\Lambda_{NbN}$: pitch of the serpentine, $d_{NbN}$: thickness of the serpentine, fill factor of the serpentine: $f_{NbN} = w_{NbN}/\Lambda_{NbN}$ with $w_{NbN}$: width of lines 44 of the serpentine).

Absorption of the structure which is schematically shown in FIG. 4 was calculated by RCWA i.e. by rigorous coupled wave analysis according to parameters f and d. Several resonances appear; these are associated to different modes of the segmented guide.

Maximum absorption $A_{max}$ of 78% is reached for a line width $w_r$ equal to 660 nm, from where $w_g = 140$ nm, and for a thickness d equal to 460 nm.

Tolerances $\Delta w_{rFWHM}$ and $\Delta w_{gFWHM}$ on parameters $w_r$ and $w_g$, expressed in the form of FWHM, i.e. full width at half maximum, equal to 42 nm for $w_r$ and $w_g$, and tolerance $\Delta d_{FWHM}$ on d also equal to 42 nm. These tolerances are not very critical from a standpoint of technological realisation of the structure.

The RCWA method was also used to calculate the reflection, transmission and absorption spectrums of the structure in FIG. 4 according to the wavelength, as well as the changes in the absorption of this structure according to the incidence angle of the light.

It is found that the length $\Delta\lambda_{FWHM}$ of the resonance in wavelength is equal to 60 nm. It is relatively wide and therefore practical for use.

Moreover, it is found that the angular width $\Delta\theta_{FWHM}$ of the resonance is equal to 23°. It is largely sufficient to efficiently couple a light beam whose diameter is equal to 10 µm and which is coming from an optical fibre.

Note that the maximum absorption of 78% is reached when the lines of the grating are centered on the NbN lines of the serpentine. Otherwise, absorption can fall about 20%. Qualitatively, the grating makes it possible to concentrate the light preferentially under the lines of the grating, and absorption is maximum if the NbN is located on the lobes of the optical electric field.

This result was obtained by simulating the intensity of the optical electric field at resonant wavelength in a period of the grating via the FDTD method, i.e. the finite-difference time-domain method.

As the period of the lobes of the optical electric field is equal to the period of the grating, the NbN lines which are located under the low index intervals, where the field is very low, can be suppressed. FDTD simulations therefore provide absorption of 82% for a resonant length of 1560 nm.

The merit in this solution is that it divides in half the required length of NbN, and therefore reduces the noise caused by the quantum or classical fluctuations, as well as the width non-uniformities of the superconducting line.

The reduction in the total length of the line and of the associated kinetic inductance allows for a faster detector. This advantage is brought out in document [Kerman 06].

It is further indicated that a thin uniform layer of a dielectric material, having a refractive index equal to $n_F$, can be added above the NbN serpentine (for reasons of technological realisation) without modifying absorption.

In an alternative of the structure which is shown in FIG. 4, the same period and the same line width are used for the NbN grating and the high index grating.

The structure is simpler to carry out since it makes it possible to use only one photolithographic level and to carry out simultaneous etching, but precision as to the dimensions is slightly higher.

Purely for information and in no way limited, the following values are used in the case of this alternative:

$\lambda_0 = 1549$ nm;

$n_i = 1$; $n_O = 1.746$; $n_B = 1$, $n_H = 3.48$; $\Lambda = 640$ nm; $w_r = 534$ nm (f=0.835) from where $w_g = 106$ nm; d=240 nm;

$\Lambda_{NbN} = 640$ nm; $f_{NbN} = 0.835$; $d_{NbN} = 4$ nm; and $n_F = 1$.

The following results are thus obtained:

$A_{max} = 77\%$; $\Delta w_{r\ FWHM} = \Delta w_{g\ FWHM} = 23$ nm; $\Delta d_{FWHM} = 37$ nm; $\Delta\lambda_{FWHM} = 50$ nm; and $\Delta\theta_{FWHM} = 18°$.

Figure 6:
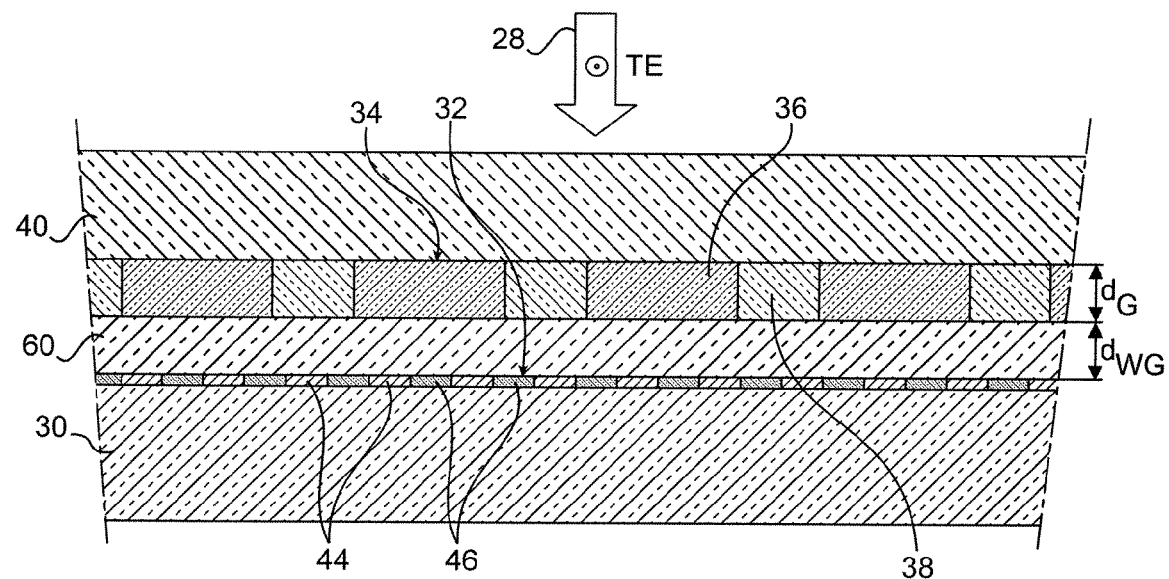

In another alternative, which is schematically shown in FIG. 6, a uniform high index dielectric layer 60 is added between the superconducting layer 44 and coupling 34. The thickness of layer 60 is noted $d_{WG}$; its refractive index $n_I$ is greater than $n_B$, $n_i$, and $n_O$, with more preferably $n_I - n_B > 1$; $n_I$ is for example equal to $n_H$.

In this case, grating 34, whose thickness is equal to $d_G$, only provides coupling for the light to the guide constituted by uniform layer 60.

Purely for information and in no way limited, the following values are used in the case of this other alternative:

$\lambda_0 = 1549$ nm;

$n_i = 1$; $n_O = 1.746$; $n_B = 1$; $n_H = 3.48$; $\Lambda = 800$ nm; $w_r = 388$ nm from where $w_g = 412$ nm; $d_G = 235$ nm; $d_{WG} = 312$ nm;

$\Lambda_{NbN} = 400$ nm; $f_{NbN} = 0.5$; $d_{NbN} = 4$ nm; $n_F = 1.45$.

The following results are thus obtained:

$A_{max} = 78\%$; $\Delta w_{r\ FWHM} = \Delta w_{g\ FWHM} > 120$ nm; $\Delta d_{WG\ FWHM} = 54$ nm; $\Delta\lambda_{FWHM} = 112$ nm; and $\Delta\theta_{FWHM} = 29°$.

This last structure also has the advantage of having very low sensitivity to the fill factor of grating 34.

The absorption of the optical detector object of the invention can be further increased by using an "asymmetrical" grating instead of a symmetrical grating.

Figure 7:
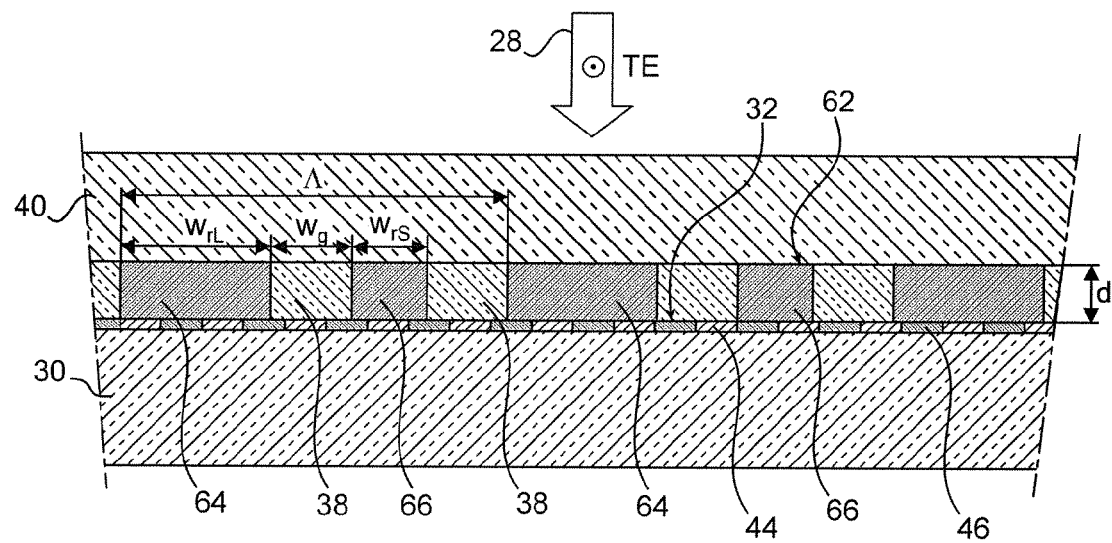

An example of a detector including an asymmetrical grating is schematically shown in FIG. 7 where grating 32 in FIG. 6 is replaced with an asymmetrical grating 62 wherein lines 64, having a width $w_{rL}$ alternate with lines 66 having a width $w_{rS}$ that is different from $w_{rL}$.

Note that lines 64 and 66 are still made of dielectric material having refractive index $n_H$.

For a symmetrical grating, there is a selection rule that authorises a single resonance in one of the two edges of the second forbidden band (see [Vincent 79]). The asymmetry of the grating lifts degeneracy (see [Vincent 79]) and a simulation of an asymmetrical grating structure by RCWA makes it possible to observe that the resonances are split into two in the plane (f, d) for each TE mode of the guide. Moreover, two resonances associated to different TE modes can cross in this plane, which can increase absorption.

Purely for information and in no way limited, the following values are used in the example in FIG. 7:

$\lambda_0$=1546 nm;

$n_i$=1; $n_O$=1.746; $n_B$=1; $n_H$=3.48; $\Lambda$=1600 nm;

$w_{rL}$=732 nm; $w_{rS}$=549 nm; the space $w_g$ between lines 64 and 66 is constant: $w_g$=160 nm; d=448 nm;

$\Lambda_{NbN}$=400 nm; $f_{NbN}$=0.5; $d_{NbN}$=4 nm; $n_F$=1.45.

It should be noted that period $\Lambda$ of grating 34 is equal to $w_r+w_g$ in the example of FIG. 4 and to $w_{rL}+w_{rS}+2w_g$ in the example of FIG. 7.

The following results are thus obtained:

$A_{max}$=92%; $\Delta w_{rL\ FWHM}$=$\Delta w_{rS\ FWHM}$=$\Delta w_{g\ FWHM}$=40 nm; $\Delta d_{FWHM}$=39 nm; $\Delta\lambda_{FWHM}$=56 nm; and $\Delta\theta_{FWHM}$=21°.

Moreover, $A_{max}$ is equal to 88% if the NbN lines are removed which are located under the intervals between the high index lines, for: $w_{rL}$=742 nm, $w_{rS}$=556 nm and d=444 nm.

Figure 8:
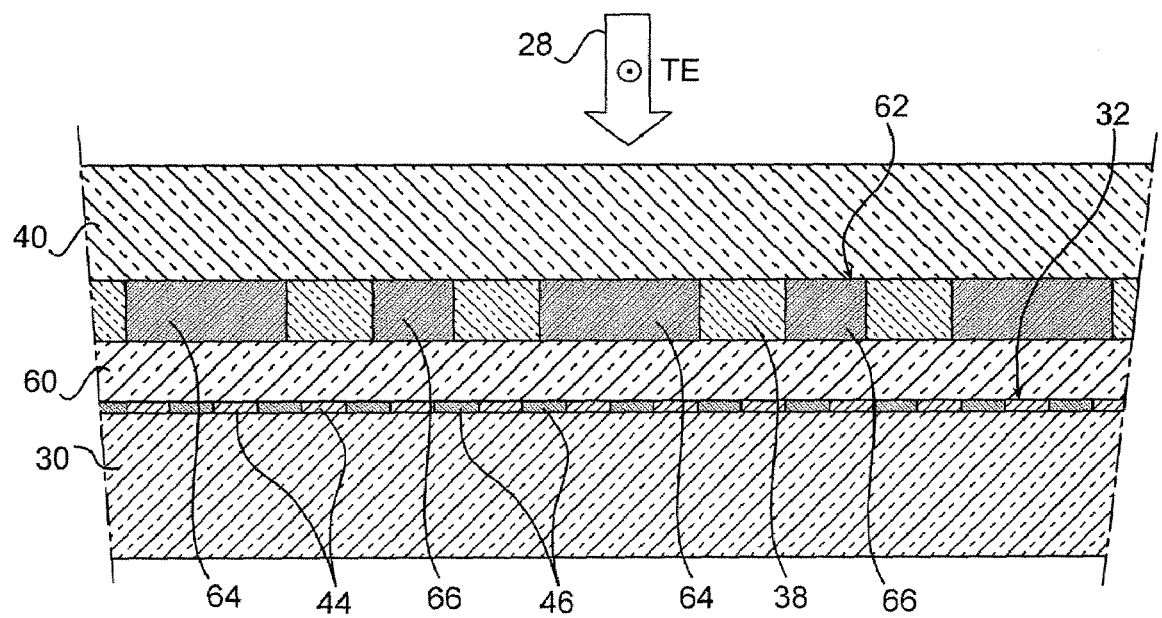

The detectors in FIGS. 6 and 7 can be "combined". This possibility is shown by the example that is schematically shown in FIG. 8. In this example, the detector includes the high index uniform layer 60 and grating 62 with asymmetrical profile, which is then comprised between layer 60 and superstratum 40.

This makes it possible to provide a higher degree of freedom to the optical detector and to obtain absorption resonances that are optimised with different geometric configurations.

Purely for information and in no way limited, the following values are used in the example in FIG. 8:

$\lambda_0$=1550 nm;

$n_i$=1; $n_O$=1.746; $n_B$=1; $n_H$=3.48; $\Lambda$=1600 nm; $w_{rL}$=616 nm; $w_{rS}$=431 nm; space between lines 64 and 66 constant: $w_g$=276 nm; $d_G$=440 nm; $d_{WG}$=598 nm;

$\Lambda_{NbN}$=400 nm; $f_{NbN}$=0.5; $d_{NbN}$=4 nm; $n_F$=1.45.

The following results are thus obtained:

$A_{max}$=94%; $\Delta w_{rL\ FWHM}$=$\Delta W_{rs\ FWHM}$=$\Delta w_{g\ FWHM}$=116 nm; $\Delta d_{G\ FWHM}$=43 nm; $\Delta\lambda_{FWHM}$=43 nm; and $\Delta\theta_{FWHM}$=12°.

In all of the structures considered above, the propagation distance of the guided wave is very short. The light remains confined laterally in a zone substantially equal to the size of the beam that is formed by the incident light. This has been verified by FDTD simulation for a Gaussian beam having a diameter equal to 10 μm.

So, we can use an NbN serpentine having a length L comparable to that which is used in prior art and which is equal to a few hundred micrometers, or a length of L/2 if the NbN lines located under the intervals between the high index lines are suppressed.

Note further that widths $w_g$ of lines 38 of grating 34 can also be unequal (as can be the widths $w_r$ of lines 36). This is of interest: the case can exist where the grating is constituted of a repeating pattern of alternating lines 36 and 38, this pattern including several lines separated unequally.

Moreover, except for the material of serpentine 32, which is usually a superconducting material, the materials used in the invention have more preferably a very low extinction coefficient, less than $5\times10^{-4}$, which render losses via absorption in these materials negligible.

It should further be noted that the detectors in accordance with the invention, that have just been described, are designed for a given polarisation (TE or TM) of the incident light. In the case of incident light with unknown polarisation, a polarisation splitter and a detector such as described above can be used on each of the output ports of this splitter.

Figure 9:
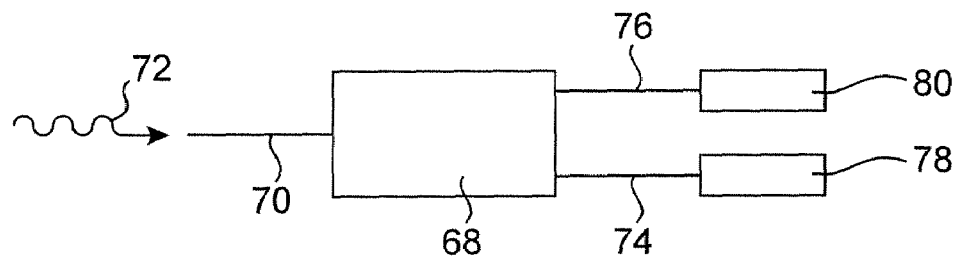
FIG. 9 is a schematic view of an optical detector including a polarisation splitter and two detectors in accordance with the invention.

This is shown schematically in FIG. 9 where a polarisations splitter 68 is shown whose input port 70 receives the light to be detected 72 and whose two output ports 74 and 76 are respectively coupled to two detectors in accordance with the invention 78 and 80 to inject therein a TE-polarised beam and a TM-polarised beam respectively, resulting from the decomposition of light 72 by splitter 68.

Examples of the optical detector, object of the invention, were provided in the case of a single pixel whose typical dimensions are 10×10 μm and which is illuminated by a focused light beam, coming for example from an optical fibre of the same diameter (10 μm).

However, the principle of the invention can be extended to the design of a matrix of pixels that is illuminated by a wider light beam, for ultra-sensitive imagery applications, in which case the angular width criterion can be made more flexible.

Detecting the light energy in the superconductor can be done:

either in accordance with the principle of threshold hot electron bolometers, that use sub-critical current polarisation, including here furthermore the PSC (phase-slip centres) mechanism, or by measuring the fast variation in Josephson current (detection of a "Josephson vortex") of a superconducting junction (STJ) or of a SQUID, or by detecting the change in impedance of a superconducting tunnel junction, that it polarised in its "gap" of quasi-particles, in accordance with the principle of SIS receivers (by suppressing the Josephson current using a magnetic field).

The following contain examples of methods of fabricating detectors in accordance with the invention.

Such a detector can be fabricated using well-mastered technological means (deposit of thin layers, substrate carryover). Layer thicknesses are not critical (tolerance of around ±5%), except for the thickness of the superconducting layer, which can be well-controlled by epitaxy.

The methods that are going to be described can apply to the fabrication of a detector including a single pixel or to the fabrication of a matrix of such detectors.

An example of fabrication of the structure that is shown schematically in FIG. 4 is given hereinafter.

1. We begin by forming a serpentine structure in a superconducting layer of NbN, whose thickness is equal to about 4 nm and whose refractive index n is equal to about 2.5+4.5 j where $j^2$=−1, by epitaxy on a sapphire substrate whose refractive index $n_S$ is equal to 1.75 to 1550 nm, as in prior art, with for example a pitch of 400 nm and a track width of 200 nm; and NbN positioning patterns (not shown) are also etched on the substrate. Then electrical contacts are formed in gold or in platinum, whose thickness is equal to about 15 nm, at the two ends of the serpentine structure, by a lift off technique.

2. Then, a layer of $SiO_2$ is deposited on top of the serpentine and its contacts, by sputtering or by PECVD at 350° C., this layer having a thickness of about 60 nm and a refractive index $n_F$ equal to 1.45. Then mechanical-chemical polishing is carried out to a depth of about 40 nm until the contacts are reached.

3. Then an SOI (silicon on insulator) substrate is prepared, including on one hand a thin layer of Si having a thickness of 460 nm and a refractive index $n_H$ equal to 3.48, this thin layer including positioning patterns, and on the other hand a layer of $SiO_2$ comprised between the SOI substrate and the thin layer of Si. A very thin layer of $SiO_2$ can be deposited on this SOI substrate in order to obtain better adherence during later bonding of the SOI substrate on the sapphire substrate, this very thin layer having a thickness of about 5 nm to 10 nm. Dry or chemical etching of deep windows is then done in the Si substrate (part of the SOI substrate) down to the $SiO_2$ layer, in order to disengage the contacts and positioning patterns.

4. "Full plate" bonding is then carried out with the SOI substrate on the sapphire substrate ($Al_2O_3$), via molecular adherence, at room temperature, after having carried out an alignment in the visible region through the silica, according to the positioning patterns, with a lateral alignment precision of +−0.5 μm being largely sufficient. Annealing can be carried out at a few hundred degrees Celsius above room temperature.

5. The Si substrate is then thinned out via mechanical-chemical polishing or via planar work down to the $SiO_2$ layer then this layer is etched.

6. Then, electron beam lithography and etching (in the example $n_B$ is equal to 1) of the Si layer is carried out, possibly in alignment with the NbN lines in order to reach maximum absorption (required precision: +−50 nm). Note that the superstratum is here comprised of air.

7. Then, the optical fibre intended for propagating the incident light beam that is to be detected is set in place. For this setting into place, an active alignment of the optical fibre on the detector is carried out. Then the electrical and optical connections are established and the detector is cooled down to its operating temperature (for example 4K).

The size of the sapphire substrates can be selected in order to be compatible with that of silicon substrates that are used in the microelectronics industry (100 or 200 mm). This makes it possible to produce many chips on the same substrate at low cost.

As for the alternatives to the structure in FIG. 4, which were mentioned above, especially the structures which are schematically shown in FIGS. 6, 7 and 8, the method of fabrication that has just been described is further comprised of a step of depositing a layer of amorphous or polycrystalline Si ($n_H$ and $n_F$ being equal and taking a value from 3 to 3.5) on the serpentine, before forming the grating, the latter then being formed on the layer of amorphous or polycrystalline Si thus deposited.

Another method of fabrication is described hereinafter, relating to the case where the silicon lines 36 follow the superconducting serpentine.

In this example of carrying out the self-aligned structure, the following steps are implemented:

1. Deposit of a superconducting layer of NbN (thickness of about 4 nm) epitaxied on a sapphire substrate, as in prior art.

2. Formation by lift-off of gold or aluminum electrodes for example, of a thickness of about 100 nm.

3. Deposit of a layer of amorphous silicon (thickness 180 nm) by magnetron sputtering.

4. Formation of the serpentine (line width 250 nm, pitch 730 nm) by electron beam lithography and simultaneous etching of the silicon and of the NbN, possibly via the intermediary of a silica hard mask.

5. Deposit of a layer of ZnS (thickness 400 nm) by sputtering and mechanical-chemical polishing until about 90 nm above the silicon.

6. Contacts obtained by etching the ZnS.

The structure proposed in this invention can be carried out by well-mastered technological means (deposit of thin layers, substrate carry-over). Layer thicknesses are not critical (tolerance of about ±5%), other than that of the superconductor, which can be well-controlled by epitaxy.

Moreover, the indicated methods can be applied to carry out a detector including a single pixel or a matrix of detectors.

In the figures, the means of polarisation of the detecting element (superconducting serpentine) and the means of signal processing provided by this element are not shown.

Moreover, instead of NbN, other superconducting materials can be used in order to form the detecting element, for example other nitride phases (for example MoN or TiN) or cuprate phases (for example $YBa_2Cu_3O_{7-x}$ or $ReBa_2Cu_3O_{7-x}$).

More generally, instead of being made of a superconducting material, this detecting element can be made of any material able to detect low light energy and to return an electric signal corresponding to this energy. This for example can be a semiconductor or bolometric material.

In the preceding examples, the superstratum is air but this can be another gas (all gases have a refractive index close to 1) or a liquid, for example liquid helium (whose refractive index is equal to 1.025) or a solid, for example silica (whose refractive index is equal to 1.45 in the visible and near-infrared regions), or even a vacuum, in which case the refractive index is equal to 1 and work is then carried out in a vacuum.

Documents mentioned in this disclosure are as follows:

[Brundrett 00] D. L. Brundrett et al., "Effects of modulation strength in guided-mode resonant subwavelength gratings at normal incidence", J. Opt. Soc. Am. A 17, 1221 (2000)

[FR 2812455] FR 2 812 455 A, R. Sobolewski et al. (Schlumberger and Rochester University, 2/2002)

[Gol'tsman 03] Gol'tsman et al., Fabrication of Nanostructured Superconducting Single Photon Detectors, IEEE Transactions on Applied Superconductivity, 13(2), 192, June 2003

[Jackson 03] D. Jackson, J. Stern, "High bandwidth, improved quantum efficiency detector development for multi −GHz class OKD throughput", Jet Propulsion Laboratory, California Institute of Technology, Single Photon Detector Workshop, NIST Gaithersburg, 4/2003

[Kerman 06] A. J. Kerman et al., "Kinetic-inductance-limited reset time of superconducting nanowire photon counters", Appi. Phys. Letters 88, 111116 (2006)

[Korneev 05] A. Korneev et al., "Quantum efficiency and noise equivalent power of nanostructured, NbN, single photon detectors in the wavelength from visible to infrared", IEEE Trans. Appl. Superconduct. 15, 571 (2005)

[LeCoupanec 03] P. LeCoupanec, W. K. Lo, K. R. Wilsher, "An ultra-low dark count and jitter, superconducting, single-photon detector for emission timing analysis of integrated circuits", Microelectronics Reliability, 43 (2003), 1621

[Nevière 73] P. Nevière et al., "Systematic study of the resonances of holographic thin film couplers", Opt. Commun. 9, 48 (1973)

[Romestain 04] R. Romestain et al., "Fabrication of superconducting niobium nitride hot electron bolometer for single photon counting", New Journal of Physics, 6, 129, (2004)

[Rosenblatt 97] D. Rosenblatt et al., "Resonant grating waveguide structures", IEEE J. Quant. Elec. 33, 2038 (1997)

[Rosfjord 06] K. M. Rosfjord, "Nanowire single photon detector with an integrated optical cavity and antireflection coating", Opt. Expr. 14, 527 (2006)

[Villégier 04] J-C Villégier, "Fabrication of High-Speed Single Photon Detectors and Analog-to-Digital Modulators in NbN Technology for Quantum Information Processing", invited conference, workshop WEH 28 November-3 December 2004, Bad Honnef, D

[Vincent 79] P. Vincent et al., "Corrugated dielectric waveguides: a numerical study of the second-order stopbands", Appl. Phys. 20, 345 (1979)

[Wang 04] F. Wang, "Photo-détecteurs supraconducteurs pour l'information quantique photonique", rapport de stage d'option scientifique, Ecole Polytechnique, juillet 2004

[Yang 05] J. K. W. Yang et al., "Fabrication development for nanowire GHz-counting-rate single photon detectors", IEEE Trans. Appl. Superconduct. 15, 626 (2005).

The invention claimed is:

1. Optical detector, intended to detect at least one photon, this detector comprising:
a dielectric substrate, having a refractive index $n_O$, and
a detecting element forming a serpentine, the detecting element being placed on the dielectric substrate and designed to generate an electric signal using the energy of the photon(s) received,
this optical detector being characterised in that it further comprises
a one-dimensional dielectric grating, including parallel lines, namely first lines that are made of a first dielectric material having a refractive index $n_H$, and second lines that alternate with the first lines and that are made of a dielectric medium having a refractive index $n_B$, the one-dimensional dielectric grating being placed above the detecting element, the set constituted by the one-dimensional dielectric grating and the detecting element presenting resonant absorption of the photon(s), at a given incidence and for a given polarisation of the photon(s), $n_H$ being greater than $n_O$ and $n_B$, and
a superstratum having a refractive index $n_i$, this superstratum being placed above the one-dimensional dielectric grating, $n_H$ being furthermore greater than $n_i$.

2. Optical detector set forth in claim 1, wherein the given incidence is a normal incidence.

3. Optical detector as claimed in claim 1, wherein the superstratum is a gas, especially air, a liquid, a solid or a vacuum.

4. Optical detector as claimed in claim 1, wherein pitch $\Lambda$ of the one-dimensional dielectric grating is less than $\lambda_O/n_O$, where $\lambda_O$ represents the wavelength in vacuum of the photon(s), and pair ($w_r/\Lambda$, d) is selected to lead to a resonant absorption, where $w_r$ represents the width of the first lines of the one-dimensional dielectric grating and d represents the thickness of this one-dimensional dielectric grating, and $\Lambda$ is furthermore less than $\lambda_O/n_i$.

5. Optical detector as claimed in claim 1, wherein the difference $n_H-n_B$ is greater than 1.

6. Optical detector as claimed in claim 1, wherein the detecting element (32) is made of a superconducting material.

7. Optical detector as claimed in claim 1, wherein the serpentine includes parallel lines, connected to each other, and each line of the serpentine is positioned facing one of the lines of the one-dimensional dielectric grating.

8. Optical detector as claimed in claim 1, wherein the serpentine includes parallel lines, connected to each other, and each line of the serpentine is positioned facing one of the first lines of the one-dimensional dielectric grating.

9. Optical detector as claimed in claim 1, wherein the serpentine includes parallel lines, connected to each other, and lines of the serpentine and the first lines of the one-dimensional dielectric grating have the same width and form periodic units having the same period.

10. Optical detector as claimed in claim 1, wherein the first lines of the one-dimensional dielectric grating have different widths $w_{rL}$ and $w_{rS}$ and the first lines whose width equals $w_{rL}$ alternate with the first lines whose width equals $w_{rS}$.

11. Optical detector as claimed in claim 1, wherein the second lines of the one-dimensional dielectric grating have different widths.

12. Optical detector as claimed in claim 1, further comprising an intermediary layer which is made of a dielectric material having a refractive index n greater than $n_B$ and which is placed between the detecting element and the one-dimensional dielectric grating.

13. Optical detector, intended to detect one photon or photons, this optical detector including a polarisation splitter including an input port, intended to receive the photon(s), and two output ports which are respectively connected to two optical detectors as claimed in claim 1.

14. Optical detector including a matrix of optical detectors as claimed in claim 1.

* * * * *